Patented Nov. 18, 1941

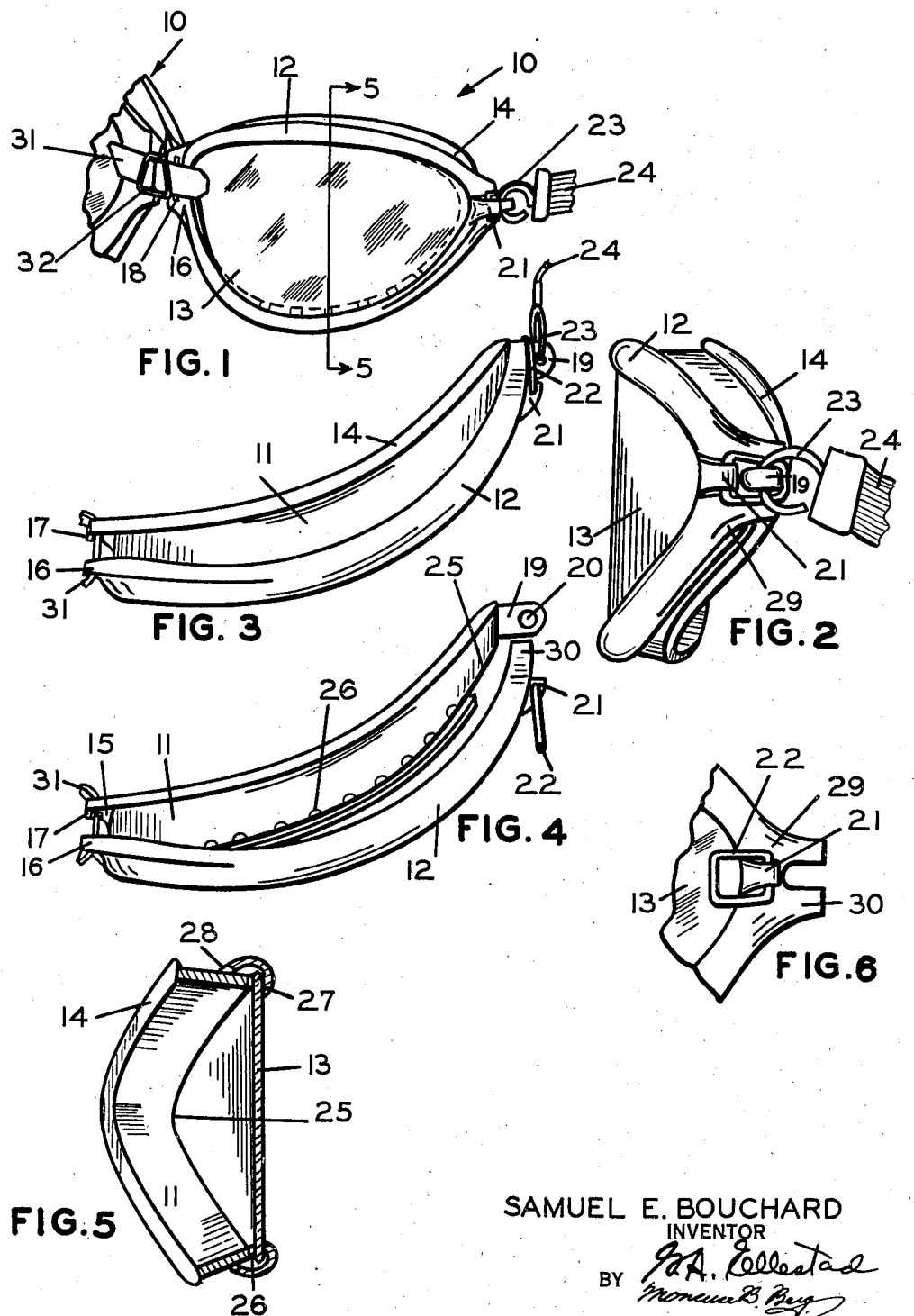

2,263,329

UNITED STATES PATENT OFFICE 2,263,329

PROTECTIVE GOGGLES

Samuel E. Bouchard, Rochester, N. Y., assignor to Bausch & Lomb Optical Company, Rochester, N. Y., a corporation of New York Application April 18, 1940, Serial No. 330,359

5 Claims. (Cl. 2—14)

The invention relates to goggles, generally of the protective type and more especially has reference to an improved mounting therefor.

It is a major object of my invention to provide an effective yet simple and inexpensive protective goggle designed primarily for industrial usage.

An equally important object of the invention is to provide a protective goggle made of molded plastic material.

Another object of my invention is to effect a goggle design permitting the members forming each lens mount to be secured together at their nasal ends by novel fastening means, which means also serve as a bridge or connection for the lens mounts themselves while other and separate means are utilized for fastening together the members of each lens mount at their temporal ends, the latter being maintained in locked condition through cooperative connection with the head band of the goggles.

Yet a further object of the invention is the provision in protective goggles of lens mounts each consisting of a molded plastic eye cup and a bezel which are detachably connected to each other and between which a lens is removably mounted, the fastening means at the nasal end of each lens mount also forming a hinged bridge which flexibly connects the lens mounts to each other, while the fastenings at the temple end of each eye cup and bezel are independent of each other but are maintained in locked condition through means carried on the head band for detachably securing the band to the lens mount.

With these and other objects in view, which may be incident to my improvements, the invention consists in the parts and combinations to be hereinafter set forth and claimed, with the understanding that the several necessary elements comprising my invention may be varied in construction, proportion and arrangement without departing from the spirit of the invention and the scope of the appended claims.

As previously noted, the invention comprehends the provision of an effective yet simple and inexpensive goggle adapted for industrial and commercial employment. Protective goggles heretofore used have generally been characterized by their relative great expense due to such factors as the cost of construction materials and the cost of working and finishing these materials as well as the relatively large number of construction parts required for such goggles.

One manner of overcoming these just-mentioned difficulties and of practically carrying out the concept of the invention is to mold the eye cups and bezels of the goggles out of appropriate plastic material. Suitable connection members are integrally formed on each eye cup and bezel at its nasal and at its temporal ends. These integrally molded connection members cooperate with each other and with separate connection and securing means for positively securing and locking the bezel of each lens mount to its eye cup and for removably mounting a lens therebetween. Also contemplated by the invention is the utilization of separate flexible connection means at the nasal end of each lens mount which not only connectively hinge the parts of each lens mount together by reason of its engagement with the integral securing members at such end but also provides a flexible and hinged bridge which connects the lens mounts to each other. In addition, the invention contemplates employment of the head band connection of each lens mount for locking the temple end of the bezel eye cup of the lens mount in assembled position.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

Fig. 1 is a perspective view showing the front of the goggles forming the subject of my invention, the right lens mount being only partially shown.

Fig. 2 is a perspective view similar to Fig. 1 but viewing one of the lens mounts from its temple end.

Fig. 3 is a top plan view of the lens mount shown in Fig. 1.

Fig. 4 is a view similar to Fig. 3 but showing the eye cup and bezel in opened position.

Fig. 5 is a partial sectional view along the line 5—5 of Fig. 1 showing the interior of the goggles in perspective.

Fig. 6 is a broken away detached plan view of the hasp connection on the bezel of one of the lens mounts.

Referring now to the drawing, throughout which like reference numerals designate corresponding parts of the invention, there is shown in Fig. 1 a pair of protective goggles comprising the lens mounts 10. Each lens mount 10 comprises two separate members, namely, an eye cup 11 and cooperating bezel 12 which are adapted to be secured to each other in a novel manner to be hereinafter described and which allow the usual cylindrical or spherical lens 13 to be removably supported between them.

The eye cups, bezels and lens are of a general oval outline shaped to the general contour of the average human orbital arch. Both the eye cups and their bezels are molded from suitable plastic material and if desired the lens may also be constructed of plastic. It should be constantly kept in mind that construction practice of this character readily lends itself to use of inexpensive plastic material which can be easily molded or worked, even into complex forms, with a very limited number of operations to produce a finished product of pleasing appearance. Moreover, plastic material of this kind possesses the added advantages of strength combined with light unit weight while it is uneffected by moisture and most acids and also may be subjected to steam sterilization without damage.

The body of each eye cup 11 has a rib 14 formed integral therewith on its facial side, which rib provides the facial contact surface of the goggles. At the nasal end of the eye cup, rib 14 is flared to provide a substantially flat bridge flange 15 having a slot 17 formed therein. This bridge flange cooperates with a similar flange on the bezel, to be later described, to permit the hinged securing of the members of the lens mount at their nasal end as well as the bridging or connection of the two lens mounts. On the temple end of the eye cup is an integral lug or head band post 19 having an opening 20 therein adapted to be engaged by the usual split resilient ring or other fastener 23 on the head band 24, for detachably fastening the latter to each lens mount. Lug 19, as will be later noted, also serves as a post for a hasp carried on the bezel for securing this member to the eye cups at their temporal ends. Each eye cup is formed with a rim 25 which is shaped to provide a suitable lens support. Cut away portions forming ventilating means 26 for the lens are provided in the rim 25 of each eye cup.

Bezel 12, of one piece construction, is of the usual type and is provided with the usual lens seat 27 adjacent to which are formed cut away portions providing ventilators 28. A substantially flat bridge flange 16 provided with suitable slot 18 is integrally formed on the nasal end of each bezel while a hasp lug 21 with swinging hasp 22 attached to the same is formed upon the bezel at its temporal end. In addition the temporal end of the bezel is shaped to provide an extending lip 29 which is bifurcated as indicated at 30. These members and elements just described are engaged or hingedly connected to their cooperating securing members formed on each eye cup so that the members of each lens mount may be fixedly held in place.

A flexible bridge connection made of the strap 31 which is passed through the slots of the complementary bridge flanges 15 and 16 of the eye cup and bezel of each lens mount is used for joining the lens mounts together as well as for securing the members of each lens mount in assembled position. The ends of the strap connection 31 are secured by any well known type of adjusting buckle 32 which permits adjustment of the working length of the strap at will.

A full understanding of the invention as well as its advantages may be derived from a consideration of the method of assembly for the goggles. In assembling, the eye cups of the goggles are placed next to each other so that their complementary bridge flanges 15 are adjacent and an end of the strap 31 forming the flexible bridge is passed through each of the slots therein in a direction towards the lens rim of each eye cup. The strap ends are now passed through the slots in the bridge flanges 18 of the bezels, after which they are secured in their desired adjusted length by the buckle fastening. It will be realized that this construction expedient not only permits a positively hinged connection of each eye cup to each bezel at their nasal ends but in addition provides a hinged bridge connection for the lens mounts themselves whereby they may pivot with respect to each other. This last-mentioned feature, it should be observed, besides providing comfort to the wearer by reason of the flexible fitting to the facial configuration, also permits the assembled goggles to be partially folded upon themselves so as to facilitate their carrying and storage.

With the eye cup and bezel of each lens mount in a slightly separated position, similar to that shown in Fig. 4 of the drawing, a lens is placed between them in alignment for proper bearing against its rim seat and either the eye cup or the bezel is swung about its hinge at its nasal end until the bifurcated lip 29 of the bezel engages the integral temple connection 19 of the eye cup. By swinging the hasp 22 about its axis on the integral lug 21 of the bezel, it may be brought into connecting engagement with the temple connection of its lens mount so as to secure the lens between the members thereof as well as to connect these members together at their temporal ends. Use is made of resilient split rings 23 which slip through the openings in the temple connection lugs of the eye cups for positively locking the eye cups in engagement with their bezels. These split rings besides providing a lock also serve as means for connecting a head band to the goggles.

Obviously the construction disclosed facilitates replacement of a lens. For either lens mount this may be accomplished by unlocking the head band ring from engagement with its temple lug 19, disengaging the hasp from the lug and then opening the lens mount by swinging the bezel about its flexible hinged connection to the eye cup at its nasal end. The lens may then be removed and replaced after which it may readily be secured in its mounting by closing and positively fastening the members of the lens mount.

From the foregoing it will be apparent that I have provided highly efficient yet inexpensive protective goggles. This is due to the use of inexpensive material capable of inexpensive working and finishing operations, as well as a material permitting working elements to be integrally formed on the main parts of the goggles and also by providing a simple designed construction consisting essentially of only five parts, namely, a pair of eye cups, bezels, and lens, flexible bridge connection for the lens mounts and a head band.

While I have shown and described the preferred embodiment of my invention, it should be understood that I do not confine myself to the precise construction details herein set forth by way of illustration as it is apparent that many changes and variations may be made therein, by those skilled in the art, without exceeding the scope of the claims hereto appended.

I claim:

1. Eye goggles comprising in combination a pair of lens mounts each having an eye cup and a bezel therefor, a lens mounted between each eye cup and bezel, a bridge flange integrally formed on each eye cup and each bezel, said bridge flanges being located at the nasal end of each eye cup and bezel and being provided with a slotted opening, flexible means passing through the slots in said flanges on said eye cups and bezels for hingedly connecting each eye cup to its bezel, said flexible means also independently hinging the lens mounts to each other, a hasp lug with hasp therefor integral with each bezel at its temporal end and a head band post formed integral with each eye cup at its temporal end and adapted to be engaged by said hasp for securing each eye cup to its bezel.

2. Eye goggles comprising in combination a pair of lens mounts each having an eye cup and a bezel therefor, a lens mounted between each eye cup and bezel, a bridge flange integrally formed on each eye cup and each bezel, said bridge flanges being located at the nasal end of each eye cup and bezel and being provided with a slotted opening, flexible means passing through the slots in said flanges on said eye cups and bezels for hingedly connecting each eye cup to its bezel, said flexible means also independently hinging the lens mounts to each other, each bezel being shaped to provide a bifurcated extending lip at its temporal end and having a hasp lug with hasp therefor integrally formed upon the outside of said lip adjacent to the bifurcated portion thereof, a head band post provided with an opening therein formed integrally upon each eye cup at its temporal end, said post being engaged by the arms of said bifurcated lip and by said hasp for securing each bezel to its eye cup, a head band for said goggles and means on the ends thereof for engaging the openings in the head band posts for connecting the head band to the goggles and for positively locking each of said bezels to its head band.

3. Eye goggles comprising in combination a pair of lens mounts each having an eye cup and a bezel therefor, a lens mounted between each eye cup and bezel, a bridge flange integrally formed on each eye cup and each bezel, each bridge flange being located at the nasal end of each eye cup and bezel and being provided with a slotted opening, a strap passing through the slots in said bridge flanges so as to secure each bezel to its eye cup and the individual lens mounts to each other, the ends of said strap being secured by a buckle, each bezel being shaped to provide a bifurcated extending lip at its temporal end and having a hasp lug with hasp therefor integrally formed upon the outside of said lip adjacent to the bifurcated portion thereof, a head band post provided with an opening therein formed integrally upon each eye cup at its temporal end, said post being engaged by the arms of said bifurcated lip and by said hasp for securing each bezel to its eye cup, and a head band for said goggles with a resilient split ring on each end of said head band for detachable engagement with the openings in each of said head band posts.

4. Eye goggles comprising in combination a pair of lens mounts each having an eye cup and a bezel therefor, a lens mounted between each eye cup and bezel, flexible means for hinging each eye cup to its bezel at the nasal ends thereof and for hinging the lens mounts to each other, means integral with each eye cup at its nasal end for engaging said flexible means and similar means integral with each bezel at its nasal end for also engaging said flexible means whereby to connect the eye cups and bezels to said flexible means, fastening means formed integrally upon each bezel at its temporal end and other fastening means integral with each eye cup at its temporal end engageable by said first mentioned fastening means whereby to secure each eye cup and its cooperating bezel to each other.

5. Eye goggles comprising in combination a pair of lens mounts each having an eye cup and a bezel therefor, a lens mounted between each eye cup and bezel, flexible means for hinging each eye cup to its bezel at the nasal ends thereof and for hinging the lens mounts to each other, means integral with each eye cup at its nasal end for engaging said flexible means and similar means integral with each bezel at its nasal end for also engaging said flexible means whereby to connect the eye cups and bezels to said flexible means, fastening means formed integrally upon each bezel at its temporal end, other fastening means integral with each eye cup at its temporal end engageable by said first mentioned fastening means whereby to secure each eye cup and its cooperating bezel to each other, a head band for said goggles and means on each end of said head band engaging a fastening means on an eye cup for connecting each end of the head band to a different lens mount and for positively locking the fastening means on each bezel in engagement with the fastening means on its respective eye cup.

SAMUEL E. BOUCHARD.